United States Patent
Reece (10) Patent No.: US 6,435,772 B1
(45) Date of Patent: *Aug. 20, 2002

(54) SUBMARINE PLOUGH (75) Inventor: Alan Richard Reece, Wylam (GB)

(73) Assignee: Soil Machine Dynamics Limited, Newcastle (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/518,422

(22) Filed: Mar. 3, 2000

Related U.S. Application Data (63) Continuation of application No. PCT/GB98/02555, filed on Aug. 25, 1998.

(30) Foreign Application Priority Data

Sep. 5, 1997 (GB) .............................................. 9718830
Nov. 26, 1997 (GB) .............................................. 9724903

(51) Int. Cl.⁷ ................................................. E02F 5/10
(52) U.S. Cl. ........................ 405/164; 405/158; 405/180
(58) Field of Search .................... 37/307, 342; 405/164, 405/165, 159, 160, 158, 154, 169, 180, 181

(56) References Cited

U.S. PATENT DOCUMENTS

| | | | | |
|---|---|---|---|---|
| 3,423,946 A | * | 1/1969 | Maclay | 405/164 |
| 3,824,798 A | | 7/1974 | Shiroyama et al. | |
| 3,898,852 A | * | 8/1975 | Ezoe et al. | 405/164 |
| 4,011,727 A | | 3/1977 | Suzuki et al. | |
| 4,362,436 A | * | 12/1982 | Harmstorf | 405/161 |
| 4,410,297 A | | 10/1983 | Lynch | |
| 4,664,553 A | | 5/1987 | Grinsted et al. | |
| 4,759,138 A | * | 7/1988 | Grinsted | 405/164 |
| 4,802,793 A | * | 2/1989 | Grinsted et al. | 405/161 |
| 4,896,998 A | * | 1/1990 | Reece | 405/160 |
| 5,988,948 A | * | 11/1999 | Featherstone | 405/164 |

FOREIGN PATENT DOCUMENTS

| | | |
|---|---|---|
| DE | 727746 | 11/1942 |
| DE | 3739041 | 5/1989 |
| EP | 296783 | 12/1988 |
| EP | 828031 | 3/1998 |
| FR | 1156475 | 5/1958 |
| GB | 1 392 800 | 4/1975 |
| GB | 1493346 | 11/1977 |
| GB | 2 027 771 | 2/1980 |

* cited by examiner

Primary Examiner—Heather Shackelford
Assistant Examiner—Frederick L. Lagman
(74) Attorney, Agent, or Firm—Altera Law Group, LLC (57) ABSTRACT

A submarine plough is disclosed comprising a plough share 216 having a cutting edge 207. A heel 220 is arranged rearwardly of the cutting edge 207, and a plough beam 205 has an attachment portion for enabling a towing means 209 to tow the plough to cut a trench in the sea floor. The plough share 216 is pivotable relative to the plough beam 205 to adjust the vertical separation between the cutting edge 207 and the attachment portion. Front skids 204 are arranged adjacent a forward end of the plough beam 205 and hydraulic rams 219 pivot the plough share 216 relative to the plough beam 205. A cable is passed in an arcuate path into the trench rearwardly of the cutting edge 207 and heel 220.

16 Claims, 6 Drawing Sheets

SUBMARINE PLOUGH

This is a continuation of PCT/GB98/02555 filed Aug. 25, 1998.

The present invention relates to submarine ploughs, and relates particularly, but not exclusively, to submarine ploughs for laying cables and other flexible products under the surface of the sea bed.

A substantial part of the world's international telecommunications is transmitted by means of fibre optic cables laid on the sea bed. A single such cable can carry a very large number of simultaneous telephone calls, and any damage sustained by such cables can result in considerable financial loss. One of the main causes of damage to cables laid on the sea bed is fishing activities, and attempts are generally made to protect cables from such interference by burying them under the surface of the sea bed. The cables are generally buried by means of a submarine plough, which is towed behind a cable laying ship and picks up a cable, laid on the sea bed, into the plough and then buries it in a trench dug in the surface of the sea bed by the plough.

Hitherto, a burial depth of one meter or less has generally been regarded as sufficient, and towing the cable plough at this depth requires a pulling force of up to 50 tonnes.

Figure 1:
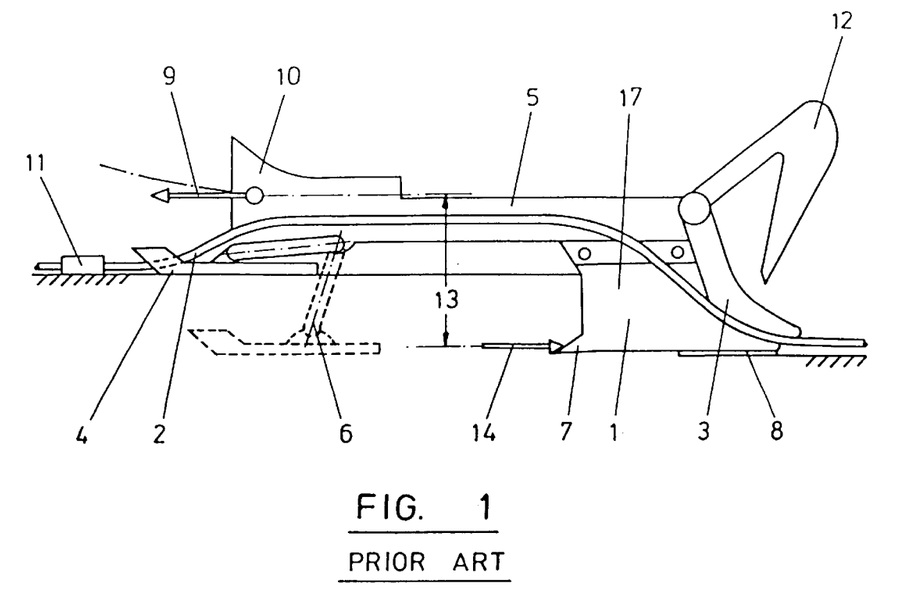
FIG. 1 is a schematic elevation view of a prior art submarine cable-laying plough adapted to lay cable to a depth of up to 1 meter.

A conventional plough for burying a cable to a depth of up to one meter in strong or hard soil is shown in FIG. 1 and comprises a plough share 1 which comprises an assembly of parts which cut and move the soil at the deepest part of a trench in the sea bed to bury a cable 2 which passes through the plough and is held down by a movable depressor 3. The plough share 1 is connected to a pair of depth control skids 4 at the front of the plough by means of a leg 17 and a long beam 5, the skids 4 being movable up or down relative to the beam 5 by moving skid support arms 6.

The cable plough runs at a generally constant depth by means of the long beam principle, which will be well known to persons skilled in the art. Under this principle, a cutting edge 7 of the plough share 1 cuts a flat bottom to the trench in the sealed, and a heel 8 supports the weight of the rear of the plough and slides along the soil surface cut by the cutting edge 7. Any tendency of the plough to alter the running depth, for example by means of the rear of the plough lifting up by pivoting about the front skids 4, is counteracted by the heel 8 lifting off the soil surface which in turn throws the weight of the rear of the plough on to the share 1 which is unable to support this additional load. As a result, the plough tends to run deeper, counteracting the movement of the rear of the plough. Conversely, it is difficult for the rear of the plough to go deeper because this requires the heel 8 to push down into the soil cut by the share cutting edge 7.

The plough is pulled by means of a tow rope 9 attached to a cable ship. The cable 2 enters the plough via a bellmouth device 10 designed to prevent the cable from being bent around radii which are too small (a typical minimum radius being of the order of 1.5 meters). If the cable 2 being laid is long it may have one or more joints or repeater amplifiers 11 at intervals along its length and which also have to pass through the plough and be buried with the cable 2. An auxiliary repeater burial share 12, which makes the cable trench wider, is used to provide the necessary space for the repeater units 11.

However, in weak soils, certain aggressive types of fishing gear can penetrate the sea bed to depth in excess of one meter, which exposes buried cables to the risk of damage. It is therefore desirable for cable ploughs to be able to bury cables deeper than one meter, for example up to three meters deep in weak soils such as soft muds. However, cable ploughs of this type, when operated in stronger soils, should also be capable of adjusting their ploughing depth to a shallower value to match the pulling force available from the cable laying ship.

Figure 2:
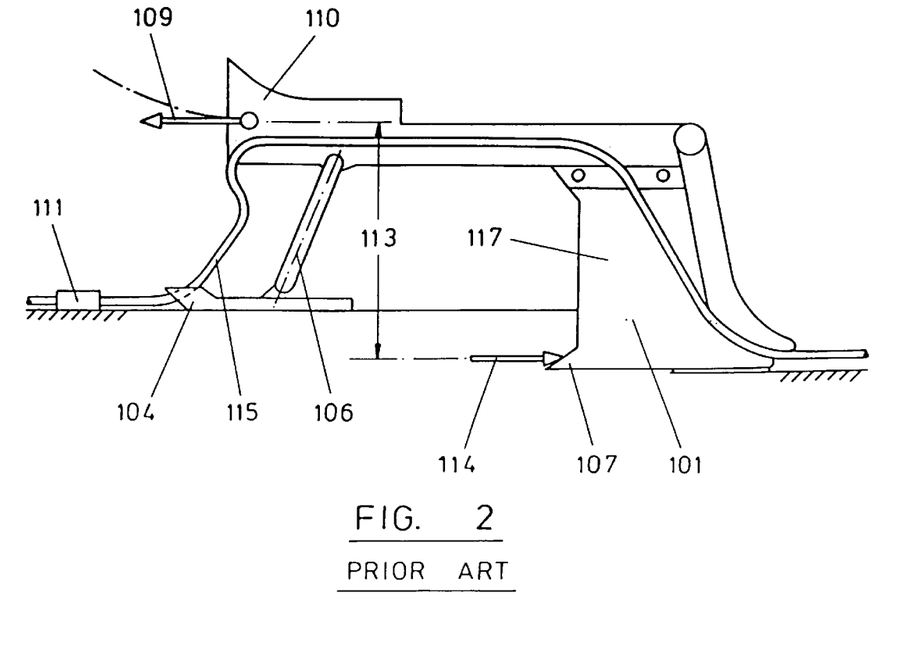
FIG. 2 is a schematic elevational view, corresponding to FIG. 1, of a prior art submarine cable-laying plough for laying cable to a depth of up to 3 meters.

FIG. 2, in which parts common to the embodiment of FIG. 1 are denoted by like reference numerals but increased by 100, denotes a conventional cable laying plough adapted to address this problem. The plough is intended to operate as deeply as possible using the 50 tonne pulling force required by a standard cable plough such that its maximum operating depth is not less than 3 meters in a weak soil such as soft mud. The plough of FIG. 2 is also intended to be not significantly larger or heavier than the existing plough of FIG. 1.

In effect, the plough of FIG. 2 consists of the plough of FIG. 1, modified to have a longer plough leg 117 and front skid arms 106 to enable the plough to reach greater depths. However, the plough of FIG. 2 has serious operational limitations which arise from the fact that the separation distance 113 between the horizontal components of the tow rope force 109 and the soil reaction 114 acting on the share 101 is very large. This is particularly so when the cable plough is digging a shallow trench in strong or hard soil, for example as shown in FIG. 2. The product of the forces 109, 114 with the separation distance 113 constitutes a couple which tends to lift the rear of the cable plough off the supporting trench surface, thus hampering penetration by the share 101. In addition, because the lower lip of bellmouth device 110 is high above the sealed, any slack in cable 102 can cause it to bend backwards on itself as shown at 115, which can cause the cable to wrap around the very small radius formed by the lower lip of the bellmouth 110. This can result in severe damage to the cable.

Preferred embodiments of the present invention seek to overcome the above disadvantages of the prior art.

According to the present invention, there is provided a submarine plough, the plough comprising:

a plough share having a cutting edge for cutting a bottom of a trench in a sea floor;

a heel portion arranged rearwardly of the cutting edge for engaging the bottom of the trench to at least partially support the plough;

a plough beam having an attachment portion for enabling towing means to be attached thereto to tow the plough to cut a trench in the sea floor, wherein the plough share is pivotable relative to the plough beam to adjust the vertical separation in use between the cutting edge and the attachment portion, sea floor engaging means arranged adjacent a forward end of the plough beam; and adjustment means for pivoting the plough share relative to the plough beam;

wherein the plough is adapted to pass an elongate flexible product therethrough in an arcuate path into the trench rearwardly of the cutting edge and the heel portion.

By adjusting the working depth of the plough by pivoting the plough share relative to the plough beam, this provides the advantage of avoiding total reliance on adjustment of the height of the sea floor engaging means. This in turn enables the working depth of the plough to be adjusted without the necessity of increasing to unacceptable levels the height of the point of attachment of the towing means above the top of the trench. As result, the risk of the elongate flexible product bending backwards on itself, resulting in damage thereto, is minimised.

In one preferred embodiment, the plough beam is rigidly attached to a plough leg, the plough share is pivotably connected adjacent a rearward portion thereof to the plough leg, and the plough is adapted to receive an elongate flexible product adjacent a forward end of the plough beam and pass the product along a rear portion of the plough leg into the trench.

This provides the advantage of enabling the flexible product upstream of the trench to remain clear of the sea bed even when the plough is at its deepest working position.

The plough share may comprise a substantially part-cylindrical surface substantially coaxial with the pivot axis of said plough share about the plough leg, and adapted to slide against a cooperating substantially part-cylindrical surface on the plough leg.

This provides the advantage of minimising any gaps between the plough share and the plough leg, thus minimising the extent to which soil and other particulate material can penetrate the plough to cause jamming thereof.

The plough share preferably comprises a pair of substantially parallel arms extending rearwardly of the share and adapted to pivotably receive a cooperating portion of the plough leg therebetween.

The adjustment means may comprise one or more linear actuators.

Preferably, the or each said linear actuator comprises a hydraulic ram.

In preferred embodiment, the or each said linear actuator includes a respective cross head and a cross pin adapted to slide in one or more arcuate slots in the plough share leg, and the or each said cross head is adapted to tightly fit inside the plough share leg and to cover the corresponding slot at each position of the pin in the slot.

This reduces the extent to which sand and other particulate material can penetrate the arcuate slots, which may cause jamming of the plough.

The plough beam may comprise two beam members connected to said plough leg.

The plough share leg is preferably connected to the beam members by means of a pair of connecting members, at least one of which comprises a removable portion to enable an elongate flexible product to be mounted to the plough.

In another preferred embodiment, the plough share comprises an elongate plough leg to which said cutting edge and said heel portion are rigidly connected, and wherein the plough leg is pivotably connected adjacent an upper portion thereof to said plough beam.

By providing an elongate plough leg which is pivotable relative to the plough beam, this gives the advantage of enabling the pivot point to be kept clear of the bottom of the trench dug by the plough, thus minimising the risk of soil or other particulate material penetrating the moving parts of the plough.

The elongate flexible product may be a telecommunications cable.

The plough preferably further comprises a bellmouth device for receiving the elongate flexible product adjacent a forward end of the plough beam.

This provides the advantage of minimising the extent to which the flexible product is forced to bend around small radii of curvature which, in the case of a cable, may otherwise cause damage.

In a preferred embodiment, the sea floor engaging means comprises one or more skids connected to the plough beam by means of a respective adjustable arm.

The plough may further comprise additional sea floor engaging means arranged rearwardly of the sea floor engaging means.

In a preferred embodiment, said additional sea floor engaging means comprises one or more skids connected to a rearward portion of the plough beam.

This provides the advantage of providing additional support to prevent the plough from sinking into soft mud.

The adjustment means may further comprise indicator means for indicating the orientation of the plough share relative to the plough beam.

The plough preferably further comprises a pair of flaps located rearwardly of the plough beam, said flaps being displaceable to allow the passage through the plough of wider portions of the elongate flexible product.

In the case of the flexible product being a telecommunications cable, this provides the advantage of enabling repeater units on the cable to be accommodated in the trench.

Preferred embodiments of the present invention will now be described, by way of example only, and not in any limitative sense, with reference to the accompanying drawings, in which.

Figure 3:
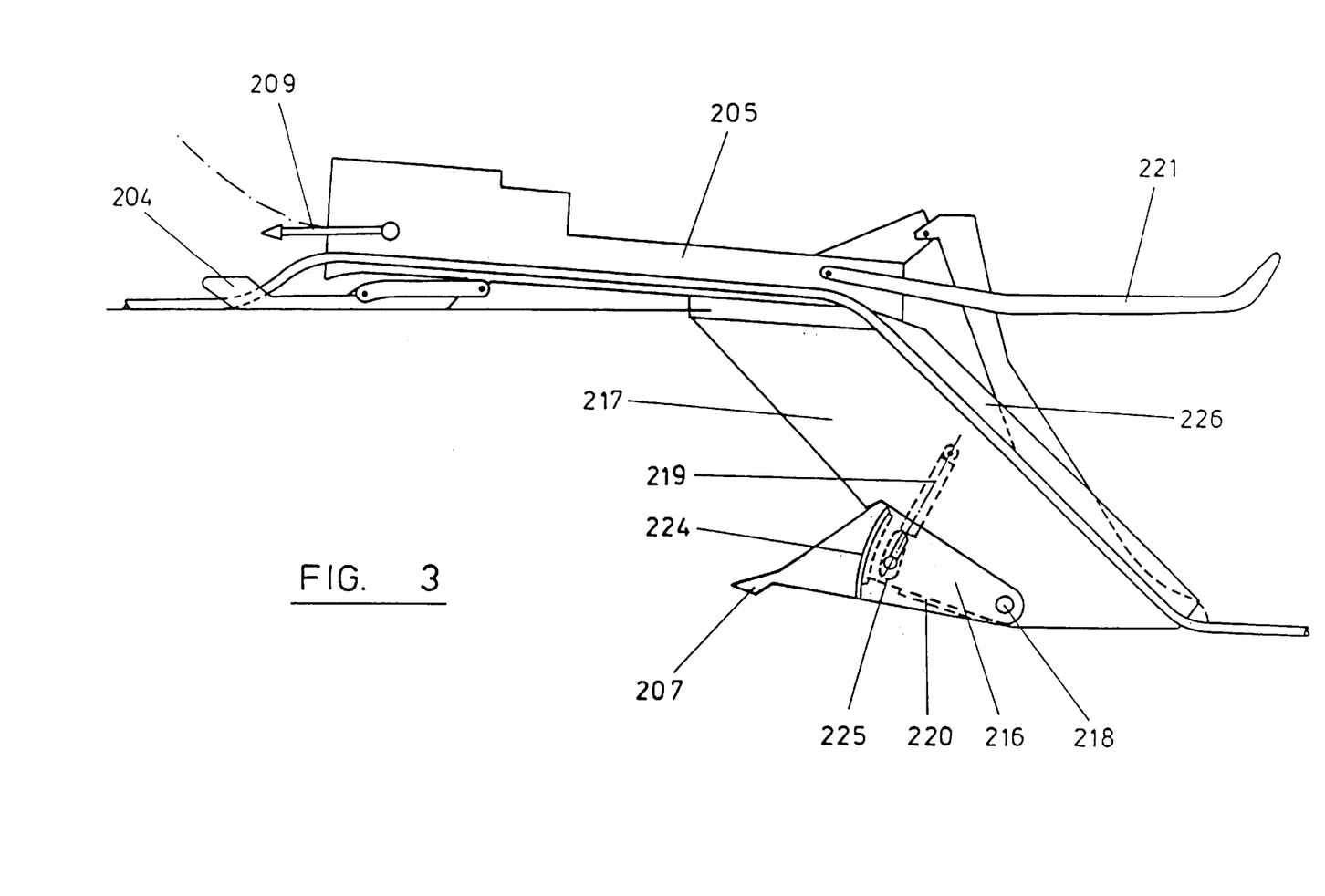
FIG. 3 is a schematic elevational view of a submarine cable-laying plough of a first embodiment of the present invention.

Referring to FIG. 3, in which parts common to the embodiment of FIG. 1 are denoted by like reference numerals but increased by 200, a submarine plough of a first embodiment of the present invention comprises a share 216 which is pivotably mounted to a plough leg 217 about a pivot 218 which is located as low down and as far back as practicable from a share cutting edge 207. The plough leg 217 is rigidly mounted to a plough beam 205, as will be described in further detail with reference to FIG. 9.

The orientation of the share 216 relative to the plough leg 217 is controlled by one or more hydraulic rams 219 provided with a position sensing device (not shown) so that the attitude of the share cutting edge 207 relative to the plough leg 217 is known. When the cutting edge 207 of the movable share 216 is pivoted downwards about pivot point 218, heel 220 no longer runs on the surface cut by the share cutting edge 207, and the cable plough will dig deeper by rotating about the front skids 204 until the heel 220 once again comes into contact with the bottom of the trench.

In the embodiment shown in FIG. 3, the rotatable share 216 provides depth adjustment of the cutting edge 207 over a range of about 1 meter, and the depth control function of the plough is supplemented by means of the front skids 204 which operate in a similar manner to the skids 4, 104 of the conventional ploughs described with reference to FIGS. 1 and 2.

Figure 4:
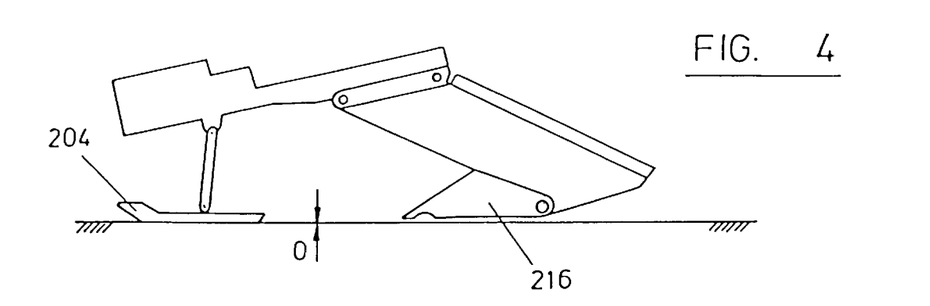
FIGS. 4 to 7 are views of the plough of FIG. 3 operating at various depths.
Figure 5:
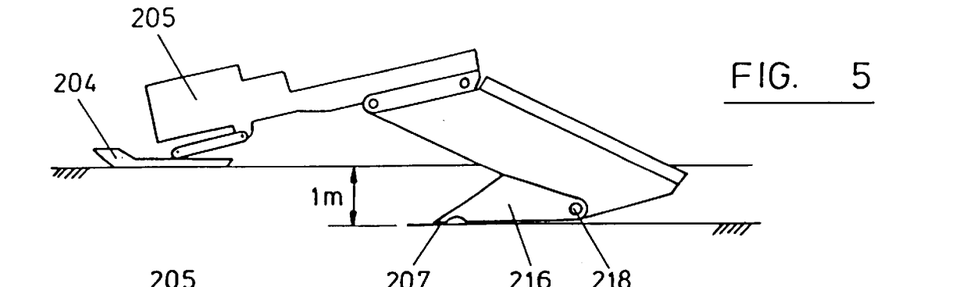

As shown with reference to FIGS. 4 and 5, the depth range of the plough from O to 1 meter is adjusted by setting the movable share 216 as shallowly as possible and raising or lowering the front skids 204. It can therefore be seen that at an operating depth of 1 meter, the front of the plough beam 205 is located closer to the surface of the sea bed than in the case of the prior art, thus reducing the possibility of the cable (not shown) bending backwards on itself and sustaining damage.

Figure 6:
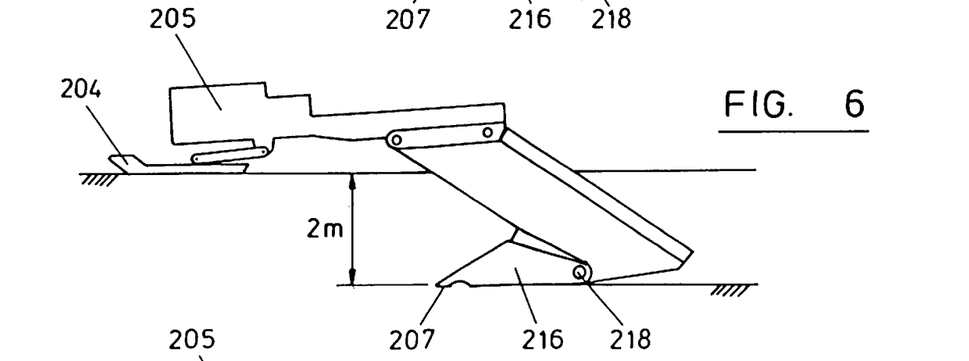

With reference to FIGS. 5 and 6, variation in the working depth from 1 meter to 2 meters is achieved by moving the share cutting edge 207 up or down about pivot axis 218 with the front skids 204 raised relative to the front of the plough beam 205.

Figure 7:
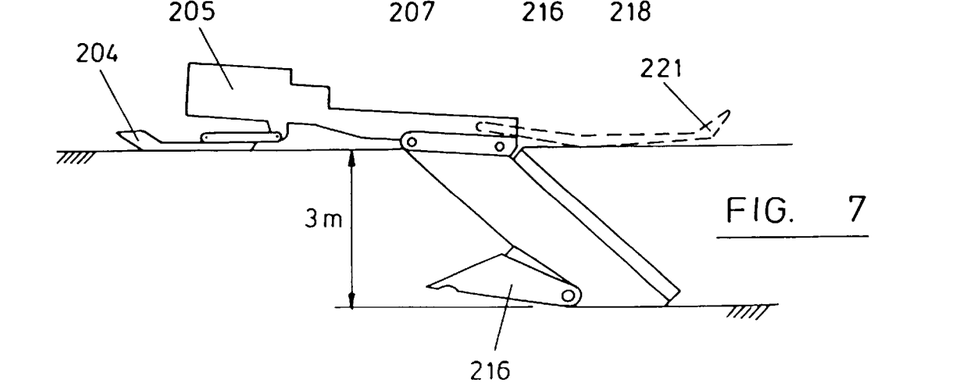

With reference to FIGS. 6 and 7, in soils which are too weak or soft to support the weight of the plough, the plough can sink to the position shown in FIG. 7, and additional support for the rear of the plough is provided by means of auxiliary skids 221 (shown by dotted lines in FIG. 7) extending from the rear of the plough beam 205 and which run on the sea bed surface.

Figure 8:
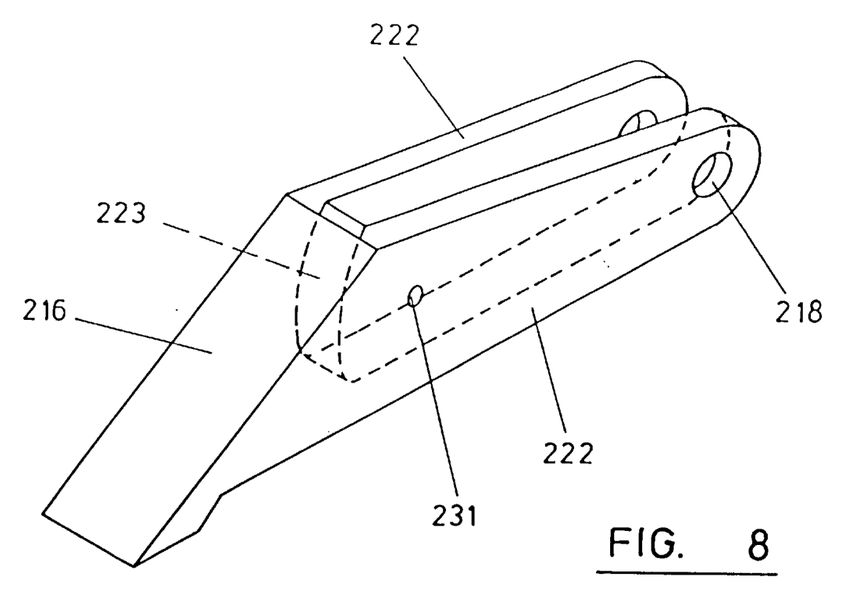
FIG. 8 is an enlarged perspective view of the plough share of the plough of FIG. 3.

Referring now to FIG. 8, the share 216 is constructed in the form of a closed hollow box provided with two long arms 222 extending rearwardly of the box. The back 223 of the box has a surface forming part of a right circular cylinder coaxial with pivot axis 218 an d which slides on a mating arcuate surface 224 provided on the front of the plough leg 217 (as shown in FIG. 3) The bottom of a plough leg 217 is a closed box having a floor which carries the heel 220.

It can therefore be seen that relative movement of the share 216 relative to the plough leg 217 takes place on sliding surfaces with zero or very small clearances between them, which minimises the extent to which soil and other particulate material can penetrate the apparatus and cause jamming thereof in an open position.

Similarly, hydraulic ram 219 has a cross pin on the end thereof to engage with holes 231 in each side 222 of the adjustable share 216, and ingress of soil into the leg box is minimised by making the rod end of the ram 219 in the form of a solid rectangular bar which is wider than the arcuate slot 225 in which it slides and makes a close fit inside the leg box.

A pair of flaps 226 is attached to the back of the plough leg 217 and provides a V-shaped guide channel when the flaps 226 are forced open. This enables repeaters 11 on the cable 2 to be accommodated, and the flaps can also be opened to provide extra support surface area when working in very weak or soft soil, since the weight of the rear of the plough would otherwise be difficult to support without providing very large additional support surfaces in the form of auxiliary skids 221.

From a comparison of FIG. 1 with FIGS. 2 and 3, it can be seen that when a large towing force 209 is applied at the front of the cable plough and is resisted by the share cutting edge 207 being retained against a rock, for example, a very large bending moment is applied to the plough beam 205 in the area where it joins the plough leg 217.

Figure 9:
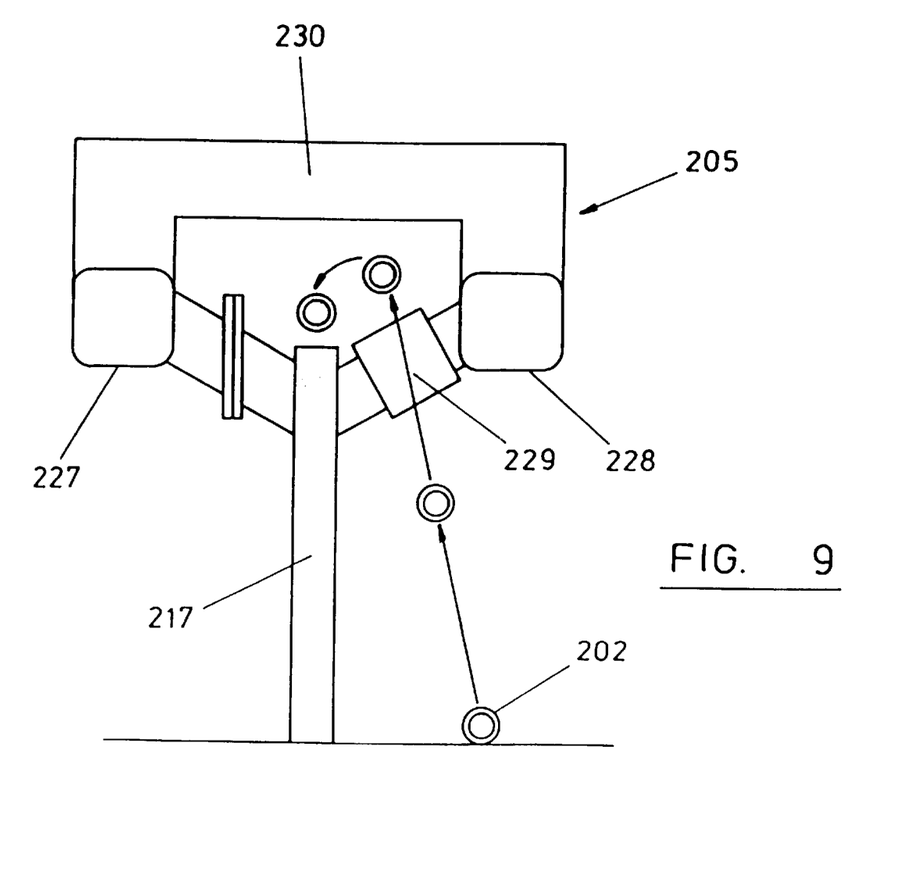
FIG. 9 is a cross-sectional elevation view of the rear of the plough beam and plough share leg of the plough of FIG. 3.

Additional strength is provided by forming the beam 205 of two horizontal beam members 227, 228 as shown in FIG. 9, and which are interconnected by tie bridges 230 at the front and rear end of the plough. The plough leg 217 is bolted on to the beam member 227 and is connected to the other beam member 228 by means of a detachable component 229 which is removable to allow cable 202 to be loaded upwards into the plough as shown in FIG. 9. By attaching the plough leg 217 to a pair of beam members 227, 228, this spreads the load evenly between the two beam members.

Figure 10:
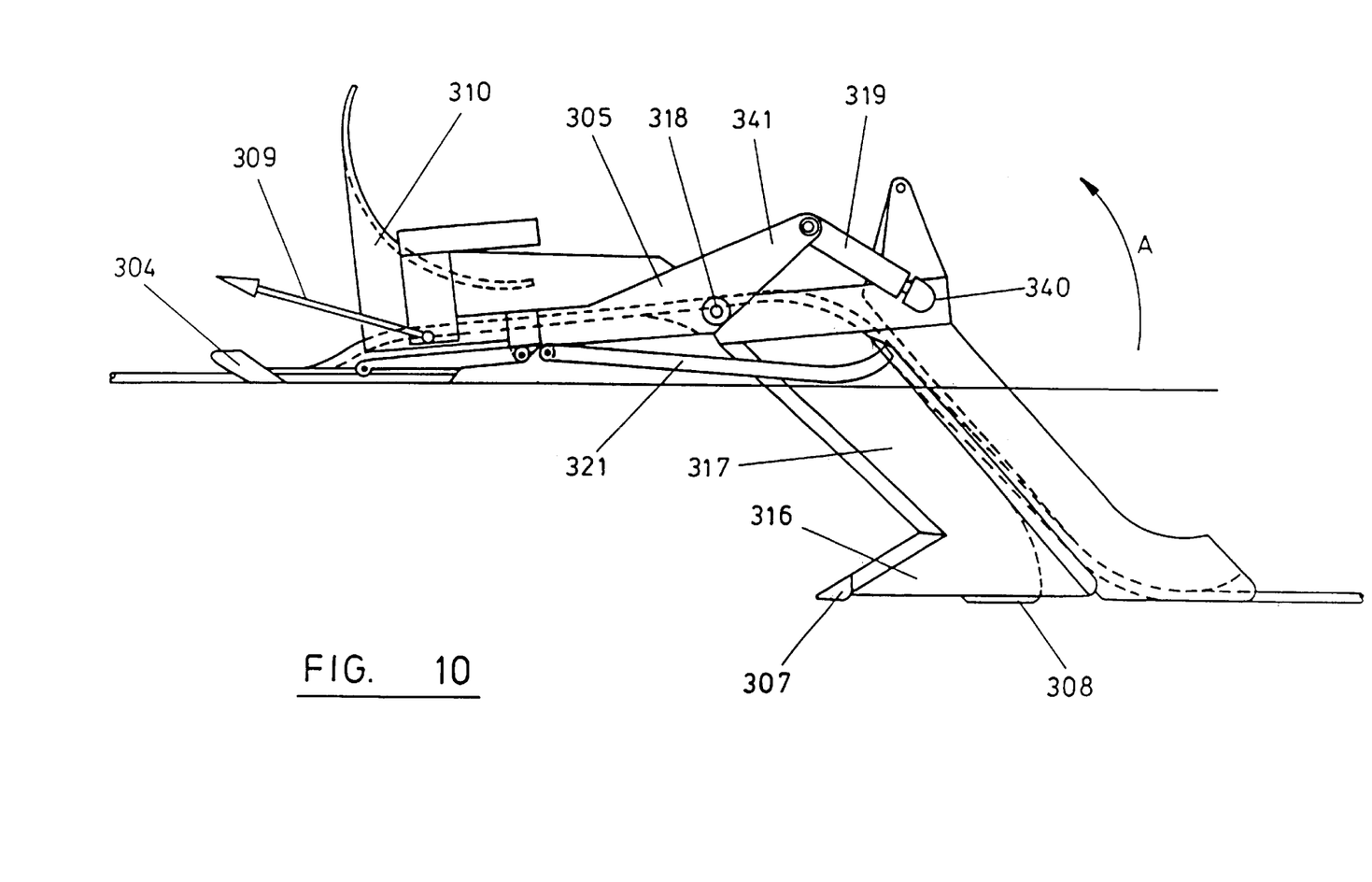
FIG. 10 corresponds to FIG. 3 and is a schematic elevational view of a submarine cable-laying plough of a second embodiment of the present invention.
Figure 11:
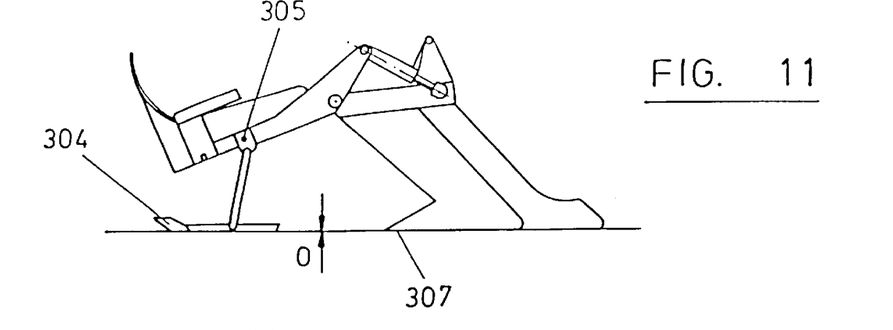
FIGS. 11 to 14 correspond to FIGS. 4 to 7 respectively and are views of the plough of FIG. 10 operating at various depths.
Figure 12:
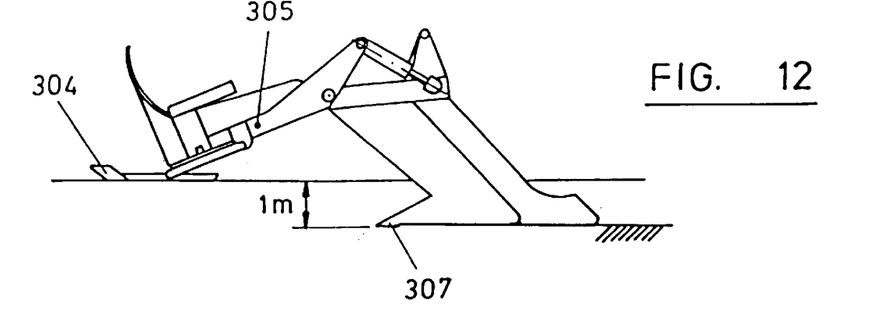
Figure 13:
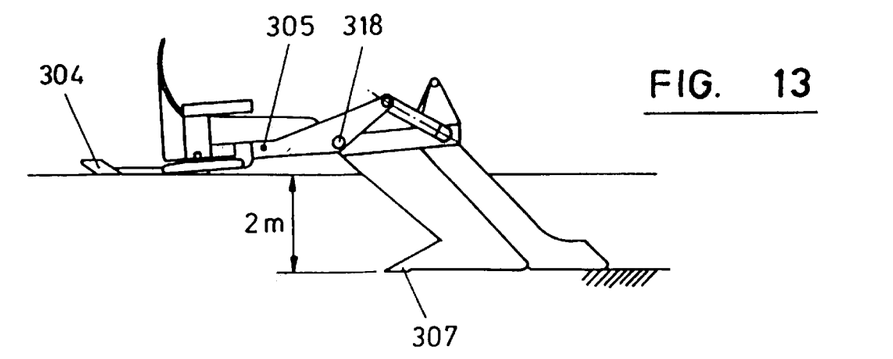
Figure 14:
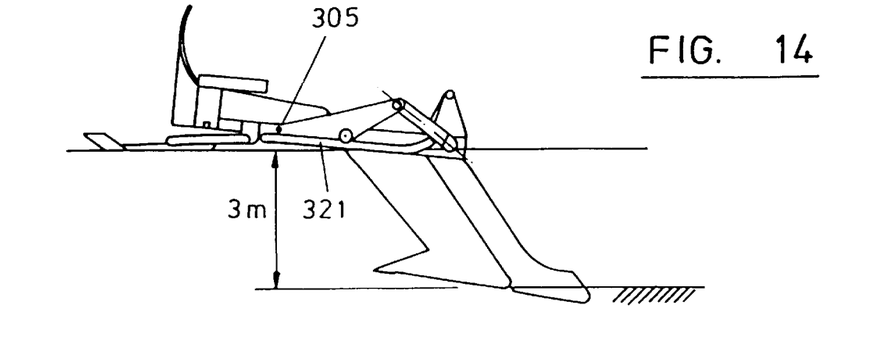

Referring now to FIG. 10, in which parts common to the embodiment of FIGS. 3 to 9 are denoted by like reference numerals but increased by 100, a submarine plough of a second embodiment of the invention comprises a plough share 316 having a forward edge 307 and heel 308, the forward edge 307 and heel 308 being integrally connected to an elongate plough leg 317. The plough leg 317 is pivotably mounted to a chassis beam 305 about a pivot 318 at the upper end of the plough leg 317

The orientation of the plough leg 317 relative to the chassis beam 305 is controlled by one or more hydraulic rams 319 connected between a rear part 340 of the upper portion of the share leg 317 and a projection 341 at the upper rear part of the chassis beam 305. The hydraulic ram 319 is provided with a position sensing device (not shown) so that the attitude of the share cutting edge 307 relative to the chassis beam 305 is known. Accordingly, when the plough leg 317 is pivoted in the direction of arrow A in FIG. 10 relative to the chassis beam 305, heel 308 no longer runs on the surface cut by the cutting edge 307, and the cable plough will dig deeper by rotating about front skids 304 until the heel 308 again comes into contact with the bottom of the trench.

By locating the pivot point 318 and the hydraulic ram 319 at the upper part of the plough leg 317, it can be seen that these parts of the plough do not pass into the trench during normal operation of the plough, which therefore minimises the extent to which soil or other particulate material can penetrate those moving parts.

It will be noted that the embodiment of FIG. 10 also differs from that of FIG. 3 in that rear stabiliser skids 321 are pivoted to a position on the chassis beam 305 slightly behind the front skids 304, as opposed to a location at the rear of the plough beam 205 in the embodiment of FIG. 3.

The depth adjustment of the plough of FIG. 10 is carried out in a similar manner to that of the plough of FIG. 3, as can be seen from a comparison of FIGS. 11 to 14 with FIGS. 4 to 7 respectively.

It will be appreciated by persons skilled in the art that the above embodiments have been described by way of example only and not in any limitative sense, and that various alterations and modifications are possible without departure from the scope of the invention as defined by the appended claims.

What is claimed is:

1. A submarine plough, the plough comprising:
   a plough share having a cutting edge for cutting a bottom of a trench in a sea floor;
   a heel portion arranged rearwardly of the cutting edge for engaging the bottom of the trench to at least partially support the plough;
   a plough beam having an attachment portion for enabling a towing device to be attached thereto to tow the plough to cut a trench in the sea floor, wherein the plough share is pivotable relative to the plough beam to adjust the vertical separation in use between the cutting edge and the attachment portion;
   a first sea floor engaging device adjacent a forward end of the plough beam and connected to the plough beam by at lease one adjustable arm; and
   adjustment device for pivoting the plough share relative to the plough beam;
   wherein the plough is adapted to pass an elongate flexible product therethrough in an arcuate path into the trench rearwardly of the cutting edge and the heel portion.

2. The plough according to claim 1, wherein the plough beam is rigidly attached to a plough leg, the plough share is pivotably connected adjacent a rearward portion thereof to the plough leg, and the plough is adapted to receive an elongate flexible product adjacent a forward end of the plough beam and pass the product along a rear portion of the plough leg into the trench.

3. The plough according to claim 2, wherein the plough share comprises a substantially part-cylindrical surface substantially coaxial with the pivot axis of said plough share about the plough leg, and adapted to slide against a cooperating substantially part-cylindrical surface on the plough leg.

4. The plough according to claim 2, wherein the plough share comprises a pair of substantially parallel arms extending rearwardly of the share and adapted to pivotably receive a cooperating portion of the plough leg therebetween.

5. The plough according to claim 1, wherein the adjustment device comprises one or more linear actuators.

6. The plough according to claim 5, wherein the or each said linear actuator comprises a hydraulic ram.

7. The plough according to claim 5, wherein the or each said linear actuator includes a respective cross head and a cross pin adapted to slide in one or more arcuate slots in the plough leg, and the or each said cross head is adapted to tightly fit inside the plough share and to cover the corresponding slot at each position of the pin in the slot.

8. The plough according to claim 2, wherein the plough beam comprises two beam members connected to said plough leg.

9. The plough according to claim 8, wherein the plough leg is connected to the beam members by a pair of connecting members, at least one of which comprises a removable portion to enable an elongate flexible product to be mounted to the plough.

10. The plough according to claim 1, wherein the plough share comprises an elongate plough leg to which said cutting edge and said heel portion are rigidly connected, and wherein the plough leg is pivotably connected adjacent an upper portion thereof to said plough beam.

11. The plough according to claim 1, wherein the elongate flexible product is a telecommunications cable.

12. The plough according to claim 1, further comprising a bellmouth device for receiving the elongate flexible product adjacent a forward end of the plough beam.

13. The plough according to claim 1, further comprising an additional sea floor engaging device rearwardly of the first sea floor engaging device.

14. The plough according to claim 13, wherein said additional sea floor engaging device comprising one or more skids connected to a rearward portion of the plough beam.

15. The plough according to claim 1, wherein the adjustment device further comprises an indicator for indicating the orientation of the plough share relative to the plough beam.

16. The plough according to claim 1, further comprising a pair of flaps located rearwardly of the plough beam, said flaps being displaceable to allow the passage through the plough of wider portions of the elongate flexible product.

* * * * *